March 23, 1926.                                                1,577,953
R. J. CARTER
COCONUT SPLITTER
Filed April 4, 1925
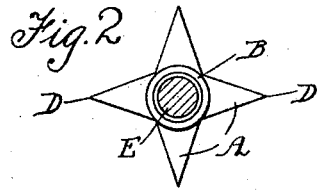
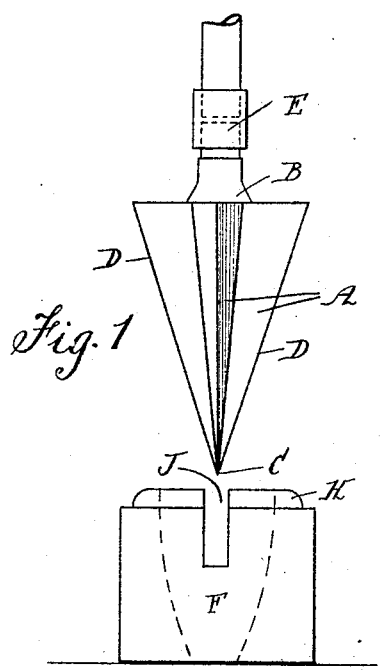
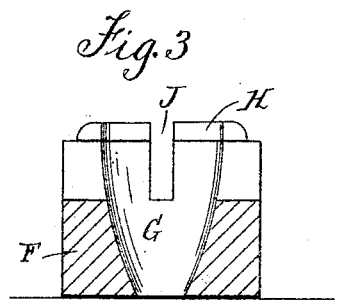
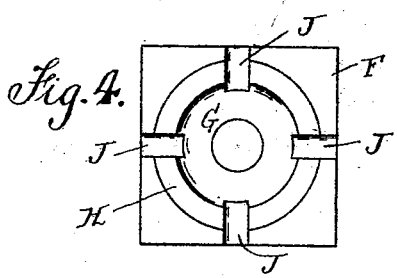
WITNESSES                                       INVENTOR
Jas. S. Hunter                                  Robert Joseph Carter
W. Alexander Patented Mar. 23, 1926.

1,577,953

UNITED STATES PATENT OFFICE.

ROBERT JOSEPH CARTER, OF APIA, WESTERN SAMOA.

COCONUT SPLITTER.

Application filed April 4, 1925. Serial No. 21,420.

*To all whom it may concern:*

Be it known that I, ROBERT JOSEPH CARTER, a subject of the King of Great Britain and Ireland, residing at Apia, Western Samoa, have invented a new and useful Improvement in a Coconut Splitter, for which I have filed applications in Great Britain, No. 26,097, Nov. 1, 1924; Australia 20,916, December 8, 1924, and New Zealand 51,666, February 4, 1924, and of which the following is a specification.

This invention has been devised with the object of providing new and effective means whereby coconuts may be split open in order to allow of the kernels being removed from the shell with a minimum of trouble.

The means devised provide for a coconut shell and kernel being cut by a spearing action into a number of separate sectors which will therefore expose the kernel and allow for the sun drying operations being carried out to curl the kernel and permit of its easy removal from the portions of the shell to which it is attached.

These means comprise the combination of a spear or javelin of special form, with a block of special form designed to have the coconut placed therein and to hold it firmly over a recess. The said spear or javelin is made with a number of sharp blades radiating from a central point and having their edges inclining to a sharp point common to them all. This point when driven on to the coconut will cleave through it and the following blades will effect a shearing cut into a number of pieces.

The apparatus forming the invention is illustrated in the accompanying drawings, in which:—

Figure 1 is a side elevation of the spear and the block in relative operative positions.

Figure 2 is a plan of the spear.

Figure 3 is a sectional elevation of the block.

Figure 4 is a plan thereof.

The spear portion of the apparatus is made with a number of steel blades A radiating from a boss B and each made to incline at its outside edge from the top downward and inward to a sharp point C that is common to all the blades. Each blade also is made of a cross-sectional shape such that its side faces taper from the joint with the other blades, to a sharp edge D at its outer edge. This edge is capable therefore of being sharpened from time to time as will be required in the use of the device. Instead of being straight as shown, this edge may be curved in its length. It also may be formed with serrations or teeth as in a saw blade.

The boss B receives a handle bar attachment E that extends in the line of the spear's length and which may be grasped by the operator's hands and the device brought point C downwards on to the coconut to be split. This device is, however, suitable for combination with mechanism of a suitable nature whereby it may be raised, and also dropped with the desired force.

The block portion F of the apparatus is made of any suitable material that will withstand the operations, as for instance, hard wood, steel, iron or concrete. It is shaped with a cup shaped hollow G in the centre of its top and which, if desired, may open right down through the bottom of the block. This hollow must at its upper end be made of a diameter such as to afford a rest for either end of a coconut placed within it, so that the coconut will be supported vertically in its axial length. Surrounding the top edge of the hollow G is a quoit shaped plate H affixed to the block.

The block and this plate are made with slots J extending radially from the side of the hollow G at its upper end and corresponding in number and position with the number and position of the blades A of the spear portion of the apparatus. The slots extend down for a distance such that their bottom ends are below the bottom of a coconut placed to rest in the hollow of the block.

It will be seen that when a coconut is placed in position within the block F and the spear is driven on to its end, the spear point will pierce into the centre of the coconut and the blades, following, will shear the whole into a number of sectors corresponding with the number of blades A and leave such sectors free to be lifted out, while the milk will drain into and through the hollow.

The number of blades in the spear may be varied from three upwards. In the drawings four are shown.

The apparatus may also be arranged to act horizontally, in certain circumstances, with equal effectiveness.

Having now particularly described and ascertained the nature of my said invention and in what manner the same is to be performed I claim:—

Apparatus for splitting coconuts consisting of a javelin-shaped knife or splitter and a block or receiver with a cup-shaped hollow to hold the coconut and having slots for the passage of the blades of the knife substantially as described and shown on the annexed drawings.

Dated this 21st day of November, 1925.

ROBT. J. CARTER.